United States Patent [19]

Nelson

[11] 4,360,634
[45] Nov. 23, 1982

[54] POLYESTER RESINS CONTAINING DIENE OLIGOMERS

[75] Inventor: Donald L. Nelson, Lake Jackson, Tex.

[73] Assignee: The Dow Chemical Company, Midland, Mich.

[21] Appl. No.: 299,702

[22] Filed: Sep. 8, 1981

[51] Int. Cl.$^3$ .............................................. C08G 63/76
[52] U.S. Cl. ........................................ 525/36; 525/44; 528/297; 528/298; 528/303; 528/304; 528/306
[58] Field of Search ............... 528/297, 298, 303, 304, 528/306; 525/36, 44

[56] References Cited

U.S. PATENT DOCUMENTS

| | | | |
|---|---|---|---|
| 3,254,060 | 5/1966 | Connolly et al. | 528/297 |
| 3,838,106 | 9/1974 | Shuki et al. | 528/303 |
| 3,933,757 | 1/1976 | Pratt et al. | 528/303 |
| 4,233,432 | 11/1980 | Curtis | 528/298 |
| 4,246,367 | 1/1981 | Curtis | 528/298 |

Primary Examiner—Lucille M. Phynes
Attorney, Agent, or Firm—B. G. Colley

[57] ABSTRACT

Polyester resins are prepared by reacting unsaturated dicarboxylic acid anhydrides with water, a diene oligomer, and a polyol or and an alkylene oxide. The polyester resins can be blended with unsaturated monomers and various fiber to give cured laminates. The advantage of this invention is that the substitution of the diene oligomers gives lower cost resins with about the same properties.

11 Claims, No Drawings

POLYESTER RESINS CONTAINING DIENE OLIGOMERS

BACKGROUND OF THE INVENTION

This invention relates to polyester resins which have been modified with diene oligomers.

It is well known that polyester resins can be modified with dicyclopentadiene. See, for example U.S. Pat. Nos. 3,347,806 and 4,029,848. According to U.S. Pat. Nos. 4,148,765 and 4,233,432, it is also known to prepare polyester resin containing dicyclopentadiene wherein maleic acid esters of dicyclopentadiene are prepared and incorporated into the polyester resins.

SUMMARY OF THE INVENTION

It has now been found that greater amounts of hydrocarbon over that known in the prior art can be incorporated into polyester resins while maintaining resin performance properties equal to or superior to conventional general purpose polyester resins or the known polyester resins containing dicyclopentadiene. The advantage of this invention is thus that lower cost resins can be prepared with about the same performance properties. This result is achieved by using oligomers of $C_4$-$C_6$ dienes.

The resins of this invention are prepared by reacting (A) an alpha, beta ethylenically unsaturated dicarboxylic anhydride containing 0-40 mole percent of saturated or unsaturated poly basic acids or anhydrides which are other than the said anhydride, (B) about 0.2 to about 3.0 moles of water per mole of unsaturated anhydride, (C) about 0.1 to about 1.2 moles of diene oligomer per mole of unsaturated anhydride, and (D) about 0.4 to about 1.3 moles of a polyol, or an alkylene oxide, or mixtures thereof per mole of unsaturated anhydride.

DESCRIPTION OF THE PREFERRED EMBODIMENTS

The polyols used to prepare the resins of this invention are those which are reactive with acids and/or anhydrides and may include, for example, ethylene glycol, propylene glycol, diethylene glycol, dipropylene glycol, 1,4-butanediol, 1,6-hexanediol, pentaerythritol, triethylene glycol, trimethylol propane, glycerol, or mixtures thereof. Preferably, the polyols used in this invention are glycols such as ethylene glycol, propylene glycol, and/or dipropylene glycol and/or diethylene glycol.

If desired, in some circumstances the use of a polyol can be eliminated and an alkylene oxide used in place thereof. The technique of preparing polyester resins from anhydrides and alkylene oxides is known from U.S. Pat. Nos. 3,374,208 and 2,822,350. In general, the technique involves using at least 90% of a dicarboxylic acid anhydride and adding an alkylene oxide having 2-4 carbon atoms such as ethylene oxide, propylene oxide, butylene oxide, or mixtures thereof.

In general, the diene oligomers used herein are prepared by heating and reacting a hydrocarbon stream containing one or more of the following hydrocarbons: dicyclopentadiene, cyclopentadiene, piperylene, isoprene, butadiene, methyl cyclopentadiene, cyclopentadiene-piperylene codimers, cyclopentadiene isoprene codimers.

A preferred aspect of this invention is the diene oligomers made by heating and reacting crude, low purity or high purity dicyclopentadiene streams.

The oligomers are commercially available or may be prepared by the method set forth in the preparations below:

For the purposes of this inventon, a crude dicyclopentadiene stream is one containing about 5 to 50 percent by weight dicyclopentadiene, a low purity stream is one containing about 50 to 95% dicyclopentadiene, and a high purity stream is one containing greater than 95% by weight dicyclopentadiene. The hydrocarbon mixtures are heated to 150°-200° C. under a pressure of 100-200 psig and in an inert gas such as nitrogen or helium for a period of time ranging from 30 minutes to 4 hours. The resultant products are believed to be mainly complex dimers, trimers, tetramers and pentamers.

Saturated polybasic acids useful to prepare these resins include, for example, orthophthalic anhydride or acid, terephthalic acid, isophthalic acid, trimellitic anhydride, adipic acid, sebacic acid, succinic acid, and the like acids or anhydrides or low molecular weight esters thereof.

Unsaturated dicarboxylic acids anhydrides useful to prepare these resins are maleic anhydride, citraconic anhydride, and mixtures thereof.

Useful unsaturated dicarboxylic acids that can be used are maleic, teraconic, itaconic, fumaric and mixtures thereof.

The polyesters of this invention are prepared by reacting in an inert atmosphere about 1 mole of an $\alpha, \beta$ ethylenically unsaturated dicarboxylic acid anhydride with 0.2 moles to about 3.0 moles of water, preferably 0.1 to 1.1 moles of water, about 0.1 moles to 1.2 moles of hydrocarbon oligomer per mole of anhydride and preferably 0.4 to 0.7 moles of oligomer and about 0.5 to 1.3 moles of a polyol, preferably 0.7 to 0.9 moles.

If desired, the polyesters of this invention can also include about 0.1 to 0.4 moles of a saturated or unsaturated acid per mole of anhydride and preferably 0.1 to 0.3 moles.

The addition order may vary; for example: (a) all components could be added at the same time, (b) the water and acid anhydride could be reacted from several minutes to several hours before adding the hydrocarbon oligomer which in turn could be reacted from several minutes to several hours before adding a polyol, (c) small amounts of polyol may be added with the water, acid anhydride and the oligomer and brought to the desired amount toward the end of the process, (d) water may be added to a mixture of anhydride and oligomer and reacted before adding a polyol.

The initial reaction temperatures can range from 50° C. to 200° C. (preferably 70° C.–140° C.) until a substantial portion of the hydrocarbon oligomer has been reacted.

After this initial reaction, the mass is heated to about 160° C. to about 250° C. and preferably 190° C. to 205° C. Water is removed with a condensing system and the reaction allowed to proceed to an acid number of about 10 to about 45.

The polyesters of this invention may also be prepared by using reaction conditions and stoichiometry so that the mono glycolate of maleic acids or bismaleate of a glycol are formed prior to addition of the hydrocarbon oligomer. In this case water is not required to facilitate oligomer maleate formation.

Still another approach is to isolate the desired intermediate mixture

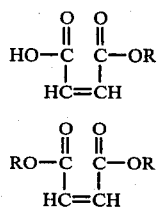

where R is a hydrocarbon oligomer before proceeding with the polyester reaction.

If desired an acid catalyst, such as boron trifluoride, sulfuric acid, toluene sulfonic acid, and the like can be used to catalyze ester formation of an acid and the hydrocarbon oligomer.

The resin is recovered and blended with an ethylenically unsaturated monomer copolymerizable with the unsaturated polyester polymers to form a blend wherein the weight ratio of polyester to monomer is in the range from about 4:1 to about 1:2. Such ethylenically unsaturated monomers are well known and include: styrene, methyl styrene, chlorostyrene, vinyl toluene, divinyl benzene, vinyl acetate, methacrylic acid, methyl methacrylate, diallyl phthalate, dicyclopentadiene alkenoates and halogenated dicyclopentadiene alkenoates, and like unsaturated monomers or mixtures thereof.

These polyester blends with unsaturated monomers should contain about 20 to about 70 percent by weight and preferably 30–50 percent by weight of the monomers based on the weight of the polyester. A small amount of an inhibitor such as tertiary butyl catechol, hydroquinone, or the like may be added to this mixture.

The final blend is a crosslinkable polyester composition which is useful to make laminates, castings or coatings.

The laminates of this invention are made by mixing into the crosslinkable composition free radical forming catalysts in known amounts and adding this mixture to a suitable fibrous reinforcement such as asbestos fibers, carbon fibers, fibrous glass, or inorganic fibers.

Examples of these catalysts are benzoyl peroxide, tertiary butyl peroxide, methylethyl ketone peroxide and the like. It is frequently of value to add accelerators and promoters such as cobalt naphthenate, dimethyl aniline, and the like.

The polyester resin is rolled, sprayed or impregnated into the fibrous reinforcement such as fibrous glass and cured in a manner well known in the art. When fibrous glass is used, it can be in any form such as chopped strands, filaments, glass ribbons, glass yarns, or reinforcing mats.

The polyester resins may be compounded with solvents, pigments, or other resinous products and cured to form useful coatings in a known manner.

The following examples and preparations are presented to illustrate but not limit the invention.

PREPARATION 1

1600 gms of crude dicyclopentadiene (83% DCPD, 16% codimers, 1% lights) were charged to a Parr reactor and pressurized to 200 psig with nitrogen. The temperature controller was set at 185° C. The total time in the temperature range of 160° C. to 185° C. was 2 hours and 38 minutes.

The product was a slurry at room temperature and believed to contain unreacted DCPD, trimer, tetramer and some heavier components with an average molecular weight about equal to the trimer (198).

PREPARATION 2

The procedure of Preparation 1 is repeated using 1600 grams of a technical grade dicyclopentadiene (97% DCPD). The product produced is similar to Preparation 1.

EXAMPLE 1

To a reactor equipped with a thermowell, temperature control, stirrer, inert gas sparge, partial condenser and full condenser was charged 392 gms (4.0 moles) of maleic anhydride. The maleic anhydride was heated to a melt temperature of 70° C. at which point about ¾ of a total charge of 50.4 gms (2.8 moles) of water was added to the reactor. After 2 minutes, ¼ of the total charge of 514.8 gms (2.4 moles) of the cyclopentadiene oligomer similar to Preparation 2 was added. After 20 minutes the solution temperature was 107° C. due to exotherm. At this point another ¼ of the oligomer was added along with the remaining portion of the water. The temperature controller was set at 120° C. and the rest of the oligomer added over a 30 minute time period. After an additional 38 minutes reaction time, 193.7 gms (3.12 moles) of ethylene glycol was added to the reactor. The temperature controller was set at 160° C., the condenser system engaged and the nitrogen gas sparge started. After 2 hours the reactor temperature control was set at 200° C. The polyester was cooked to a final acid number of 27. 100 ppm hydroquinone was added when the temperature was reduced to 160° C. The percent hydrocarbon content was calculated to be 46.6% by weight.

EXAMPLE 2

To a reactor described in Example 1 with the same addition order and approximately the same temperature conditions were added the following components:
313.6 gms (3.2 moles) maleic anhydride,
125.6 gms (0.8 moles) of a mixture of dimethyl esters of adipic acid, glutaric acid and succinic acid with an average molecular weight of 157,
514.8 gms (2.4 moles) cyclopentadiene oligomer,
50.4 gms (2.8 moles) water,
193.7 gms (3.12 moles) ethylene glycol.

The dibasic esters and ethylene glycol were added to the reactor immediately prior to the 160° C. heat cycle. The resin was cooked to an acid number of 13. The resin was cooled to 160° C. and 100 ppm hydroquinone added. When blended with 43% styrene the resin had a gel time of 7.7 min., a cure time of 14.7 minutes and a maximum exotherm of 146° C. when cured at 180° F. with 1% benzoyl peroxide.

CONTROL 1

The following components were used to prepare a dicyclopentadiene polyester:
784 gms (8.9 moles) maleic anhydride,
653.7 gms (4.8 moles) 96.9% $C_{10}$ hydrocarbon DCPD concentrate,
100.8 gms (5.6 moles) water,
387.5 gms (6.24 moles) ethylene glycol.

The heat and charge schedule was exactly as described in Example 1 except that a $C_{10}$ hydrocarbon was used in place of the CPD oligomer. The resin was inhibited with 100 ppm hydroquinone. The final acid number was 25. The percent hydrocarbon content was calculated to be 36.3%.

CONTROL 2

Using the same reactor equipment, a general purpose polyester resin was prepared using known procedures from:
0.4 moles maleic anhydride,
0.6 moles phthalic anhydride,
1.08 moles propylene glycol.

The final acid number was about 30. It was inhibited with 100 ppm hydroquinone.

The following results were obtained from the resins of Example 1, Controls 1 and 2 when they were cured with styrene.

TABLE I

| PROPERTIES | Example 1 | Control 1 | Control 2 |
|---|---|---|---|
| 30% Styrene | | | |
| Viscosity, cps | 1260 | 1725 | — |
| 180° F. SPI gel gel time**, (min.) | 5.6 | 3.4 | — |
| cure time, (min.) | 7.5 | 5.6 | — |
| max. exotherm | 212° C. | 222° C. | — |
| 43% Styrene | | | |
| Viscosity, cps | 127 | 161 | 105* |
| 180° F. SPI Gel gel time**, (min.) | 5.3 | 3.0 | 7.3* |
| cure time. (min.) | 7.5 | 5.0 | 10.9* |
| max. exotherm | 227° C. | 240° C. | 204° C.* |

*with 44% styrene
**cured with 1% benzoyl peroxide.

EXAMPLE 3 (DLN-585122-26)

A reactor equipped as in Example 1 was charged with 392 gms (4.0 moles) of maleic anhydride and brought to a melt temperature of 70° C. ¾ of the total 50.4 gms (2.8 moles) of water to be used was added. This was immediately followed with about ¼, of a total of 475.2 gms (about 2.4 moles) to be used, of an oligomer commercially available from the C.X.I. Corporation. The oligomer was believed to be prepared from a hydrocarbon cracking by-product stream and it contains primarily cyclopentadiene, or its dimer DCPD, piperylene, and isoprene. A slight exotherm to 111° C. was observed. The remaining water and oligomer were added over the next 30 minute period. After 2 hours at 120° C.–135° C., 193.7 gms (3.12 moles) of ethylene glycol was added, the controller set at 160° C., the nitrogen sparge, partial condenser, and full condenser were engaged. After 1½ hours the temperature was set at 205° C. where it stayed until an acid number of 34 was attained. Since about 14% of the hydrocarbon did not react, 12.4 gms of ethylene glycol was added 2 hours and 15 minutes before the end of the cook to aleviate sublimation. 100 ppm hydroquinone was added during cool down.

The resin was blended with 30% styrene. The room temperature solution viscosity was about 8000 cps. The density was 1.0991. When catalyzed with 0.5% cobalt naphthenate 6% and 1.5% MEK peroxide the resin had a room temperature gel time of 3.5 minutes; a cure time of 9.6 minutes; and a maximum exotherm of 184° C.

EXAMPLE 4

The resins of Example 1 and Controls 1 and 2 were mixed with 30% by weight of styrene and 1% benzoyl peroxide, cast into molds from which test specimens having the dimensions 1"×3"×⅛" were cut. The strips were then weighted and immersed in toluene for 3 days at 45° C. and the gain in weight recorded. The results as shown in Table II.

TABLE II

| | Toluene Resistance (% wt increase) | | |
|---|---|---|---|
| | Example 1 | Control 1 | Control 2 |
| Toluene | 0.90 | 0.33 | failed* |

*indicates the strip fell apart.

The above data indicates that the resin containing the oligimer had outstanding solvent resistance.

Test strips were prepared as in Example 4 and placed in an oven at 210° C. with periodic weighting to determine weight loss. The results are set forth in Table III.

TABLE III

| | Weight Loss in Percent by Weight at 210° C. | |
|---|---|---|
| | Example 1 | Control 1 |
| 2 days | 0.74 | 0.47 |
| 10 days | 1.41 | 1.56 |
| 25 days | 2.40 | 2.76 |

The data in Table III shows that Example 1 is substantially better than the control in weight loss. The Control 2 resin is known to have a 25 to 50% weight loss under the same conditions.

I claim:
1. The resin produced by reacting
   (A) an alpha, beta ethylenically unsaturated dicarboxylic anhydride containing 0–40 mole percent of saturated or unsaturated polybasic acids or anhydrides which are other than said anhydride,
   (B) about 0.2 to about 3.0 moles of water per mole of unsaturated anhydride,
   (C) about 0.1 to about 1.2 moles of diene oligomer per mole of unsaturated anhydride, and
   (D) about 0.4 to about 1.3 moles of a polyol, or an alkylene oxide, or mixtures thereof per mole of unsaturated anhydride.
2. The resin of claim 1 blended with a liquid ethylenically unsaturated monomer.
3. The blend of claim 2 wherein the weight ratio of resin to monomer is in the range from about 4:1 to about 1:2.
4. A cured fibrous laminate made from the blend of claim 2.
5. A cured fibrous laminate made from the blend of claim 3.
6. The resin of claim 1 wherein the diene oligomer is produced by heating dicyclopentadiene.
7. The resin produced by reacting
   (A) an alpha, beta ethylenically unsaturated dicarboxylic anhydride containing 0–40 mole percent of saturated or unsaturated polybasic acids or anhydrides which are other than said anhydride,
   (B) about 0.1 to about 1.1 moles of water per mole of unsaturated anhydride,
   (C) about 0.4 to about 0.7 moles of diene oligomer per mole of unsaturated anhydride wherein the oligomer is produced by heating dicyclopentadiene, and
   (D) about 0.7 to about 0.9 moles of a polyol, per mole of unsaturated anhydride.

8. The resin of claim 7 blended with a liquid ethylenically unsaturated monomer.

9. The blend of claim 8 wherein the weight ratio of resin to monomer is in the range from about 4:1 to about 1:2.

10. A cured fibrous laminate made from the blend of claim 8.

11. A cured fibrous laminate made from the blend of claim 9.

* * * * *